United States Patent [19]
Beisele

[11] Patent Number: 6,048,946
[45] Date of Patent: Apr. 11, 2000

[54] HYDROPHOBIC EPOXY RESIN SYSTEM

[75] Inventor: Christian Beisele, Auggen, Germany

[73] Assignee: Ciba Specialty Chemicals Corp., Tarrytown, N.Y.

[21] Appl. No.: 09/137,371

[22] Filed: Aug. 20, 1998

[30] Foreign Application Priority Data

Aug. 27, 1997 [CH] Switzerland .............................. 1997/97

[51] Int. Cl.[7] .................................................. C08G 65/32
[52] U.S. Cl. .............................. 525/403; 525/426; 528/27
[58] Field of Search ..................................... 525/403, 476; 528/27

[56] References Cited

U.S. PATENT DOCUMENTS

| 3,926,885 | 12/1975 | Keil | 260/29.1 |
| 5,523,374 | 6/1996 | Bard et al. | 528/26 |

FOREIGN PATENT DOCUMENTS 2305454  12/1990  Japan .

OTHER PUBLICATIONS

Patnode, W. et al., J. Am. Chem. Soc., vol. 68, pp. 358–363 (1946).

*Primary Examiner*—Melvyn I. Marquis
*Attorney, Agent, or Firm*—Michele A. Kovaleski

[57] ABSTRACT

A composition, which comprises
  (a) a cycloaliphatic epoxy resin,
  (b) an OH-terminated polysiloxane,
  (c) a polysiloxane/polyether copolymer, and
  (d) a cyclic polysiloxane,
has excellent hydrophobic properties and can be used as electric insulation composition.

13 Claims, No Drawings

HYDROPHOBIC EPOXY RESIN SYSTEM

HYDROPHOBIC EPOXY RESIN SYSTEM

The present invention relates to a composition comprising a cycloaliphatic epoxy resin and different polysiloxanes, to crosslinked products obtainable by curing such a composition as well as to the use of this composition as electric insulator.

Epoxy resins are often employed as electric insulating material because of their good mechanical properties and their high specific resistance. Because of their high weathering resistance, cycloaliphatic epoxy resins are particularly suitable for outdoor use. However, in very rainy regions with highly polluted air there is the problem that a conductive layer of dirt/water can form on the surface of the insulator, resulting in leakage currents and electric arcs which may damage the insulator and even cause complete breakdown. Even in the case of little-contaminated epoxy-based insulators the surface conductivity can increase when, due to weathering, the surface erodes in the course of time and a layer thus roughened can be more readily wet by water.

As is disclosed in U.S. Pat. No. 3,926,885, hydrophobic properties can be imparted to epoxy resins by addition of polysiloxane/polyether copolymers and OH-terminated polysiloxanes. However, the adhesion of this material to metal is not sufficient for all applications. JP-A 2-305454 describes epoxy resin mixtures having high moisture stability and comprising, besides an epoxy novolak and a phenolic resin, small amounts of a cyclic dimethylsiloxane. Although in these compositions the corrosion caused by the water bound to the surface is substantially prevented, such systems do not achieve a sufficiently hydrophobic effect for use as insulator.

It has now been found that compositions comprising a cycloaliphatic epoxy resin and three specific polysiloxanes form storage-stable emulsions having very good hydrophobic properties.

This invention relates to a composition, which comprises:
(a) a cycloaliphatic epoxy resin,
(b) an OH-terminated polysiloxane,
(c) a polysiloxane/polyether copolymer, and
(d) a cyclic polysiloxane.

In the compositions of this invention, the amounts of the components (a) to (d) can vary within a wide range. Preferred compositions are those comprising, based on the entire composition, 94.0–99.7% by weight, preferably 94.6–98.5% by weight, of component (a), 0.1–2.0% by weight, preferably 0.5–1.8% by weight, of component (b), 0.1–2.0% by weight, preferably 0.5–1.8% by weight, of component (c), and 0.1–2.0% by weight, preferably 0.5–1.8% by weight, of component (d), the sum of components (a), (b), (c) and (d) being 100% by weight.

Within the scope of this invention, the term "cycloaliphatic epoxy resin" stands for all epoxy resins containing cycloaliphatic structural units, i.e. it includes cycloaliphatic glycidyl compounds and β-methylglycidyl compounds as well as epoxy resins based on cycloalkylene oxides.

Suitable cycloaliphatic glycidyl compounds and β-methylglycidyl compounds are the glycidyl esters and β-methyl glycidyl esters of cycloaliphatic polycarboxylic acids, such as tetrahydrophthalic acid, 4-methyltetrahydrophthalic acid, hexahydrophthalic acid, 3-methylhexahydrophthalic acid and 4-methylhexahydrophthalic acid.

Other suitable cycloaliphatic epoxy resins are the diglycidyl ethers and β-methyl glycidyl ethers of cycloaliphatic alcohols, such as 1,2-dihydroxycyclohexane, 1,3-dihydroxycyclohexane and 1,4-dihydroxycyclohexane, 1,4-cyclohexanedimethanol, 1,1-bis(hydroxymethyly)cyclohex-3-ene, bis(4-hydroxycyclohexyl)methane, 2,2-bis(4-hydroxycyclohexyl)propane and bis(4-hydroxycyclohexyl)sulfone.

Examples of epoxy resins containing cycloalkylene oxide structures are bis(2,3-epoxycyclopentyl)ether, 2,3-epoxycyclopentyl glycidyl ether, 1,2-bis(2,3-epoxycyclopentyl)ethane, vinyl cyclohexene dioxide, 3,4-epoxycyclohexylmethyl-3',4'-epoxycyclohexanecarboxylate, 3,4-epoxy-6-methylcyclohexylmethyl-3',4'-epoxy-6'-methylcyclohexanecarboxylate, bis(3,4-epoxycyclohexylmethyl)adipate and bis(3,4-epoxy-6-methylcyclohexylmethyl)adipate.

Preferred cycloaliphatic epoxy resins are bis(4-hydroxycyclohexyl)methane diglycidyl ether, 2,2-bis(4-hydroxycyclohexyl)propane diglycidyl ether, tetrahydrophthalic acid diglycidyl ester, 4-methyltetrahydrophthalic acid diglycidyl ester, 4-methylhexahydrophthalic acid diglycidyl ester and, in particular, hexahydrophthalic acid diglycidyl ester and 3,4-epoxycyclohexylkmethyl-3',4'-epoxycyclohexanecarboxylate.

The OH-terminated polysiloxanes according to component (b) can be prepared by known methods, for example by hydrolysing the corresponding organochlorosilanes and subsequently polycondensing the silanols, which usually results in polysiloxane mixtures having molecular weights of 1'000–150'000 g/mol. A number of such OH-terminated polysiloxanes are commercially available.

Liquid polysiloxanes are preferably used in the compositions of this invention.

It is preferred to use a polysiloxane of formula I

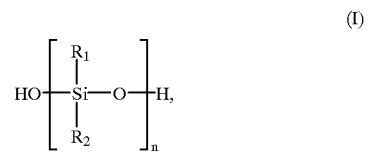

wherein $R_1$ and $R_2$ are each independently of the other $C_1$–$C_{18}$alkyl, $C_6$–$C_{14}$aryl or $C_7$–$C_{24}$aralkyl, and n is an average value of 3 to 60, preferably of 4 to 20.

Alkyl includes, for example, methyl, ethyl, isopropyl, n-propyl, n-butyl, isobutyl, sec-butyl, tert-butyl as well as the different isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups. Aryl $R_1$ or $R_2$ preferably contains 6 to 10 carbon atoms and may be, for example, phenyl, tolyl, pentalinyl, indenyl, naphtyl, azulinyl and anthryl. Aralkyl $R_1$ or $R_2$ preferably contains 7 to 12 carbon atoms, particularly preferably 7 to 10 carbon atoms, and may be, for example, benzyl, phenethyl, 3-phenylpropyl, α-methylbenzyl, 4-phenylbutyl or α,α-dimethylbenzyl.

Particularly preferred polysiloxanes are those of formula I, wherein $R_1$ and $R_2$ are each independently of the other methyl, ethyl or phenyl.

Particularly preferred components (b) are polysiloxanes of formula I, wherein $R_1$ and $R_2$ are methyl.

Component (c) of the novel compositions can be linear and also branched block copolymers. These copolymers can have Si—O—C-linkages or Si—C-linkages between the polysiloxane and the polyether segments. Copolymers having Si—O—C-linkages can be prepared, for example, by reacting polysiloxanes with reactive terminal groups (e.g. hydrogen, halogen, alkoxy, acetyl or dialkylamino) and with polyether alcohols. Copolymers containing Si—C-linkages are obtainable, for example, by hydrosilylising polyethers containing vinyl terminal groups with siloxanes containing Si—H groups. Branched copolymers having a polysiloxane main chain and linear polyether side chains are particularly interesting within the scope of this invention.

The novel compositions preferably contain as component (c) a copolymer which comprises polydimethylsiloxane as polysiloxane segment.

Other preferred components (c) are copolymers containing polyethylene oxide, polypropylene oxide or a polyethylene oxide/polypropylene oxide copolymer as polyether segment.

Suitable polysiloxane/polyether copolymers are commercially available, e.g. NM 4205 (Hüls AG).

The cyclic polysiloxanes according to component (d) are also known to the skilled person and can be prepared by known methods.

It is preferred to use as component (d) a cyclic polysiloxane of formula II

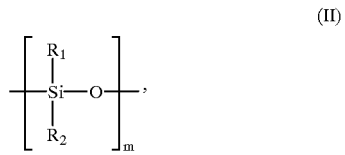

wherein $R_1$ and $R_2$ are each independently of the other $C_1$–$C_{18}$alkyl, $C_6$–$C_{14}$aryl or $C_7$–$C_{24}$aralkyl, and m is an integer from 4 to 12.

Preferred components (d) are cyclic polysiloxanes of formula II, wherein $R_1$ and $R_2$ are each independently of the other methyl, ethyl or phenyl, and m is an integer from 4 to 6.

$R_1$ and $R_2$ are particularly preferably methyl.

As is described in *J. Am. Chem. Soc.* 68, 358 (1946), such cyclic polysiloxanes can be isolated from the product mixture obtained by the hydrolysis of the corresponding dialkyl-, diaryl- or diaralkyldichlorosilanes.

Particularly preferred as components (d) are the compounds octamethylcyclotetrasiloxane, decamethylcyclopentasiloxane and, in particular, dodecamethylcyclohexasiloxane, which are commercially available.

The novel compositions can, in principle, be cured with all customary epoxy hardeners. However, it is preferred to use anhydride hardeners.

In another of its aspects, this invention therefore relates to a composition comprising the above components (a) to (d) and additionally as component (e) a polycarboxylic acid anhydride.

These anhydrides may be linear aliphatic polymeric anhydrides, for example polysebacic polyanhydride or polyazelaic polyanhydride, or cyclic carboxylic acid anhydrides.

Cyclic carboxylic acid anhydrides are particularly preferred.

Examples of cyclic carboxylic acid anhydrides are:

succinic anhydride, citraconic anhydride, itaconic anhydride, alkenyl-substituted succinic anhydride, dodecenylsuccinic anhydride, maleic anhydride and tricarballylic anhydride, maleic anhydride adduct with cyclopentadiene or methylcyclopentadiene, linoleic acid adduct with maleic anhydride, alkylated endoalkylenetetrahydrophthalic anhydride, methyltetrahydrophthalic anhydride and tetrahydrophthalic anhydride, the isomeric mixtures of the latter two being particularly suitable. Hexahydrophthalic anhydride and methylhexahydrophthalic arhydride are particularly preferred.

Other examples of cyclic carboxylic acid anhydrides are aromatic anhydrides, such as pyromellitic dianhydride, trimellitic anhydride and phthalic anhydride.

It is also possible to use chlorinated or bromated anhydrides, for example tetrachlorophthalic anhydride, tetrabromophthalic anhydride, dichloromaleic anhydride and chlorendic anhydride.

Where required, the novel compositions can additionally comprise a curing accelerator (f). Suitable accelerators are known to the skilled person. Examples to be mentioned are:

complexes of amines, in particular tertiary amines, with boron trichloride or boron trifluoride;

tertiary amines, such as benzyldimethylamine;

urea derivatives, such as N-4-chlorophenyl-N',N'-dimethylurea (monuron);

unsubstituted or substituted imidazoles, such as imidazole or 2-phenylimidazole.

Preferred accelerators are tertiary amines, in particular benzyldimethylamine.

The components (e) and (f) are used in the customary effective amounts, i.e. in amounts sufficient for curing the novel compositions. The ratio of the components (a) and (e) and, where present, (f), depends on the kind of compounds used, on the required curing speed and on the desired properties of the final product and can be easily determined by the skilled person. Usually, 0.4 to 1.6, preferably 0.8 to 1.2, equivalents of anhydride groups are used per epoxy equivalent. The resin mixture (a) to (d) and the curing component (e), where required together with the accelerator (f), are generally stored separately and are mixed only shortly before application.

The curable mixtures can also comprise tougheners, for example Core/Shell polymers or the elastomers or elastomer-containing graft polymers known to the skilled person as rubber tougheners. Suitable tougheners are disclosed, for example, in EP-A-449 776.

The curable mixtures may additionally contain fillers, for example metal powder, wood flour, glass powder, glass beads, semimetal oxides and metal oxides, typically $SiO_2$ (aerosiles, quartz, quartz powder, synthetic silica flour), aluminium oxide and titanium oxide, metal hydroxides, such as $Mg(OH)_2$, $Al(OH)_3$ and $ALO(OH)$, semimetal nitrides and metal nitrides, for example silicon nitride, boron nitride and aluminium nitride, semimetal carbides and metal carbides (SiC), metal carbonates (dolomite, chalk, $CaCO_3$), metal sulfates (baryte, gypsum), mineral powders and natural or synthetic minerals, mainly from the silicate series, for example zeolite (in particular molecular sieves), talcum, mica, kaolin, wollastonite, bentonite and others.

The curable mixtures can contain other customary additives besides the ones mentioned above, for example antioxidants, light stabilisers, flame retardants, crystal water-containing fillers, plasticisers, colourants, pigments, thixotropic agents, tougheners, defoamers, antistatic agents, lubricants and demoulding agents.

The novel compositions can be prepared by known methods using known mixing apparatus, for example stirrers (in particular dispersers and Supraton®), kneaders, rolls or dry mixers. In the case of solid epoxy resins, dispersion can also be carried out in the melt.

The novel mixtures can be cured in known manner in one or two steps. The cure is generally carried out by heating to a temperature range from 60° C. to 200° C., preferably from 80° C. to 180° C.

This invention also relates to the crosslinked products obtainable by curing a composition according to this invention.

In contrast to the corresponding unmodified systems, the addition of the three siloxane components in the novel compositions surprisingly results in no, or only minor, deterioration of the mechanical and electrical properties of the cured products. As regards toughness, the systems of this invention are even superior, which is revealed by their substantially higher fracture energy $G_{1C}$ and higher critical stress intensity factor $K_{1C}$.

The addition of silicones generally results in a deterioration of the adhesion properties. The novel compositions, however, unexpectedly have good adhesion on metal which is revealed by their unchanged good cantiveler strengths.

The excellent hydrophobic behaviour of the novel systems is particularly interesting. The cured epoxy resin mixture is not only substantially more hydrophobic than a comparable unmodified resin; the hydrophobic property is also transferred to a foreign layer applied to the cured product (so-called hydrophobic transfer effect). Thus an initially hydrophilic layer of dirt becomes hydrophobic and contact with water (e.g. during rain) does not result in the formation of a conductive dirt/water layer as in the case of the unmodified system.

The novel compositions are particularly suitable as casting resins, laminating resins, moulding compositions, coating compositions and, in particular, as electric insulating compositions.

The use of the novel composition as electric insulator constitutes another subject matter of this invention.

In the following Examples the following commercially available substances are used:

epoxy resin 1: hexahydrophthalic acid diglycidyl ester (epoxy value: 5.6–6.2 val/kg)

hardener 1 hardener mixture consisting of 70.0 parts by weight of hexahydrophthalic anhydride and 30.0 parts by weight of methylhexahydrophthalic anhydride Silbond W 12 EST: quartz powder pretreated with epoxysilane (Quarzwerke Frechen)

polysiloxane 1: OH-terminated polydimethylsiloxane having a viscosity of 5 Pa·s (Hüls AG)

NM 4205 polyether-modified silicone consisting of polydimethylsiloxane main chains with trimethylsiloxy terminal groups and polyether side chains with polyethylene oxide/polypropylene oxide copolymers and butoxy terminal groups; molecular weight: 14000 g/mol, viscosity: 800±250 mPa·s (Hüls AG)

EXAMPLE 1

9550 g of epoxy resin 1,150 g of polysiloxane 1,150 g of NM 4205 and 150 g of dodecamethylcyclohexasiloxane are weighed out in a mixer apparatus fitted with a dispersion disk and are mixed at room temperature for 1 hour at 3000 rpm. This mixture is then degassed, with stirring, for 10 min in a vacuum of about 10 mbar, resulting in a white emulsion. Using a blade mixer, 1000 g of the resin premix so obtained are mixed with 860 g of hardener 1, 4.8 g of benzyldimethylamine and 3620 g of quartz powder Silbond W 12 EST for 30 min at 60° C., and this mixture is then briefly degassed at about 10 mbar.

The composition is then cured for 6 h at 80° C. and for 10 h at 140° C. The properties of the cured product are summarised in Table 1.

COMPARISON EXAMPLE 1

Using a blade mixer, 1000 g of hexahydrophthalic acid diglycidyl ester (epoxy value: 5.6–6.2 val/kg) is mixed with 900 g of a hardener mixture consisting of 70.0 parts by weight of hexahydrophthalic anhydride and 30.0 parts by weight of methylhexahydrophthalic anhydride, 5.0 g of benzyldimethylamine and 3700 g of a silanised quartz powder over 30 min at 60° C., and this mixture is then briefly degassed at about 10 mbar. The composition is then cured for 6 h at 80° C. and for 10 h at 140° C. The properties of the cured product are summarised in Table 1.

APPLICATION EXAMPLE 1

Support insulators are produced by means of the pressure gelation method. This is done by injecting the uncured mixtures prepared according to Example 1 and Comparison Example 1 into a metal mould heated to 140° C. and treated with demoulding agents. After gelation (after about 20 min) the moulded article is removed from the mould and post-cured for 10 h at 140° C. The insulator prepared from the novel composition unexpectedly has higher cantilever strength than the insulator prepared from the analogous composition without silicone additives (see Table 1).

APPLICATION EXAMPLE 2

The following tests demonstrate the improved behaviour of the insulators, prepared using the system modified according to this invention, in highly polluted atmospheres and, in particular, their improved hydrophobic properties: Samples of the material prepared according to Example 1 and Comparison Example 1 are examined in accordance with DIN 53364 for hydrophobic properties. To this purpose a test liquid (ethylene glycol monoethyl ether+colourant) having a surface tension of 30 dyn/cm is applied with a small hairbrush to the samples which were previously cleaned with ethanol. In the sample according to this invention, the applied test ink film immediately contracts, whereas in the comparison system without silicone additives the liquid adheres substantially longer than the required 2 seconds. This shows that the system modified according to this invention has less surface energy, i.e. that it is clearly more hydrophobic.

To detect the so-called hydrophobic transfer effect, contamination is artificially applied to two sheets of the material prepared according to Example 1 and Comparison Example 1 (prepared without using any silicone-containing demoulding agents and cleaned with ethanol after demoulding). A suspension consisting to 90% of water and to 10% of aluminium hydroxide is applied to the sample in a layer thickness of about 1 mm. After sedimentation of the colourant, the supernatant water is removed with a pipette. After drying for 3 days at room temperature, a drop of water is applied to the foreign layer using a pipette. In the comparison system (mixture of Comparison Example 1) the drop of water immediately runs into the foreign layer of aluminium hydroxide whereas in the system modified according to this invention (mixture of Example 1) the drops remain lying on the surface of the foreign layer or roll off when the sample is tilted.

TABLE 1

|  | Example 1 | Comparison Example 1 |
| --- | --- | --- |
| epoxy resin 1 [parts by weight] | 95.5 | 100 |
| polysiloxane 1 [parts by weight] | 1.5 |  |
| NM 4205 [parts by weight] | 1.5 |  |
| dodecamethylcyclohexasiloxane | 1.5 |  |

TABLE 1-continued

|  | Example 1 | Comparison Example 1 |
|---|---|---|
| [parts by weight] |  |  |
| hardener 1 [parts by weight] | 86 | 90 |
| Silbond W 12 EST [parts by weight] | 362 | 370 |
| filler content | 66% | 66% |
| thermal expansion coefficient [ppm/K] | 32.3 | 33.1 |
| tensile strength [MPa] | 84 | 89 |
| ultimate elongation [%] | 1.2 | 1.1 |
| modulus of elasticity [MPa] | 11124 | 11632 |
| flexural strength [MPa] | 151 | 156 |
| flexural elongation [%] | 1.6 | 1.5 |
| flexural modulus of elasticity [MPa] | 11610 | 12211 |
| critical stress intensity factor $K_{1C}$ [Mpa · (m)$^{1/2}$] | 2.6 | 2.4 |
| fracture energy $G_{1C}$ [J/m$^2$] | 544 | 437 |
| track resistance (CTI) | >600M-0.0 | >600M-0.0 |
| arc resistance (ASTM D495) [s] | 187/194 | 189/192 |
| cantilever strength [N] | 6120 | 5830 |
| hydrophobic transfer effect | yes | no |
| wettability | no | yes |
| water absorption (10 d at 23° C.) | 0.12% | 0.12% |
| weight loss after 10 d at 200° C. | 1.09 | 1.01 |

What is claimed is:

1. A composition, which comprises:

(a) a cycloaliphatic epoxy resin, (b) an OH-terminated polysiloxane, (c) a polysiloxane/polyether copolymer, and (d) a cyclic polysiloxane.

2. A composition according to claim 1, which comprises, based on the entire composition, 94.0–99.7% by weight of component (a), 0.1–2.0% by weight of component (b), 0.1–2.0% by weight of component (c), and 0.1–2.0% by weight of component (d), the sum of components (a), (b), (c) and (d) being 100% by weight.

3. A composition according to claim 1, wherein component (a) is hexahydrophthalic diglycidyl ester or 3,4-epoxycyclohexylmethyl-3'4'-epoxycyclohexanecarboxylate.

4. A composition according to claim 1, wherein component (b) is a polysiloxane of formula I

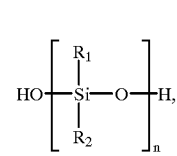

(I)

wherein $R_1$ and $R_2$ are each independently of the other $C_1$–$C_{18}$alkyl, $C_6$–$C_{14}$aryl or $C_7$–$C_{24}$aralkyl, and n is an average value of 3 to 60.

5. A composition according to claim 4, wherein component (b) is a polysiloxane of formula I, wherein $R_1$ and $R_2$ are each independently of the other methyl, ethyl or phenyl.

6. A composition according to claim 4, wherein component (b) is a polysiloxane of formula I, wherein $R_1$ and $R_2$ are methyl.

7. A composition according to claim 1, wherein component (c) is a copolymer comprising polydimethylsiloxane as polysiloxane segment.

8. A composition according to claim 1, wherein component (c) is a copolymer comprising polyethylene oxide, polypropylene oxide or a polyethylene oxide/polypropylene oxide copolymer as polyether segment.

9. A composition according to claim 1, wherein component (d) is a cyclic polysiloxane of formula II

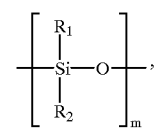

(II)

wherein $R_1$ and $R_2$ are each independently of the other $C_1$–$C_{18}$alkyl, $C_6$–$C_{14}$aryl or $C_7$–$C_{24}$aralkyl, and m is an integer from 4 to 12.

10. A composition according to claim 9, wherein component (d) is a cyclic polysiloxane of formula II, wherein $R_1$ and $R_2$ are each independently of the other methyl, ethyl or phenyl, and m is an integer from 4 to 6.

11. A composition according to claim 9, wherein component (d) is octamethylcyclotetrasiloxane, decamethylcyclopentasiloxane or dodecamethylcyclohexasiloxane.

12. A composition according to claim 1, which additionally comprises as component (e) a polycarboxylic acid anhydride.

13. A crosslinked product obtainable by curing a composition according to claim 12.

* * * * *